(12) United States Patent
Lavagnino et al.

(10) Patent No.: US 7,006,669 B1
(45) Date of Patent: Feb. 28, 2006

(54) MACHINE VISION METHOD AND APPARATUS FOR THRESHOLDING IMAGES OF NON-UNIFORM MATERIALS

(75) Inventors: Sherrill E. Lavagnino, Oakland, CA (US); Jeffrey Michael Wolinsky, Berkeley, CA (US)

(73) Assignee: Cognex Corporation, Natick, MA (US)

( * ) Notice: Subject to any disclaimer, the term of this patent is extended or adjusted under 35 U.S.C. 154(b) by 617 days.

(21) Appl. No.: 09/753,240

(22) Filed: Dec. 31, 2000

(51) Int. Cl.
*G06K 9/00* (2006.01)

(52) U.S. Cl. .................. 382/111; 356/238.1; 700/130
(58) Field of Classification Search ............ 382/100, 382/111, 257, 250, 261, 264, 274, 281, 283, 382/172, 270; 340/86, 92, 125, 130, 744, 340/745, 746, 306; 356/400, 477, 238.1, 356/238.2, 243.7, 429; 700/259, 130
See application file for complete search history.

(56) References Cited

U.S. PATENT DOCUMENTS

| | | |
|---|---|---|
| 3,816,722 A | 6/1974 | Sakoe et al. |
| 3,936,800 A | 2/1976 | Ejiri et al. |
| 3,967,100 A | 6/1976 | Shimomura |
| 3,968,475 A | 7/1976 | McMahon |
| 3,978,326 A | 8/1976 | Shimomura |
| 4,011,403 A | 3/1977 | Epstein et al. |
| 4,115,702 A | 9/1978 | Nopper |
| 4,115,762 A | 9/1978 | Akiyama et al. |
| 4,183,013 A | 1/1980 | Agrawala et al. |
| 4,200,861 A | 4/1980 | Hubach et al. |
| 4,254,400 A | 3/1981 | Yoda et al. |
| 4,286,293 A | 8/1981 | Jablonowski |
| 4,300,164 A | 11/1981 | Sacks |
| 4,385,322 A | 5/1983 | Hubach et al. |
| 4,435,837 A | 3/1984 | Abernathy |
| 4,441,124 A | 4/1984 | Heebner et al. |
| 4,441,206 A | 4/1984 | Kuniyoshi et al. |
| 4,519,041 A | 5/1985 | Fant et al. |
| 4,534,813 A | 8/1985 | Williamson et al. |

(Continued)

FOREIGN PATENT DOCUMENTS

EP      0 265 302 A1      9/1987

(Continued)

OTHER PUBLICATIONS

Bursky, Dave, "CMOS Four-Chip Set Process Images at 20-MHz Data Rates," Electronic Design, May 28, 1987, pp. 39-44.

(Continued)

*Primary Examiner*—Kanjibhai Patel
*Assistant Examiner*—Abolfazl Tabatabai
(74) *Attorney, Agent, or Firm*—David J. Powsner (57) ABSTRACT

Machine vision inspection methods and systems according to the invention take an average (or other statistical measure) of pixel values within neighborhoods or groups of pixels within an image. The averages are compared with one or more thresholds and a result generated for each neighborhood. The results generated for all such neighborhoods can, for example, be used to identify defective regions in the acquired image, notwithstanding a high degree of intensity, brightness, color or contrast variation at the pixel level—e.g., of the type commonly occurring when imaging non-woven materials. Such methods and systems are advantageous because an originally acquired, high-resolution (non-defocused) image can be preserved and processed in parallel with a neighborhood-based defocused and thresholded image. Systems employing these methods achieve the thresholding capability of traditional defocused systems, while providing clear, detailed, high-resolution images for display or other analysis. Such systems provide this dual capability using image data acquired from a single camera or camera array.

25 Claims, 4 Drawing Sheets

U.S. PATENT DOCUMENTS

| | | |
|---|---|---|
| 4,541,116 A | 9/1985 | Lougheed |
| 4,545,067 A | 10/1985 | Juvin et al. |
| 4,570,180 A | 2/1986 | Baier et al. |
| 4,577,344 A | 3/1986 | Warren et al. |
| 4,581,762 A | 4/1986 | Lapidus et al. |
| 4,606,065 A | 8/1986 | Beg et al. |
| 4,617,619 A | 10/1986 | Gehly |
| 4,630,306 A | 12/1986 | West et al. |
| 4,631,750 A | 12/1986 | Gabriel et al. |
| 4,641,349 A | 2/1987 | Flom et al. |
| 4,688,088 A | 8/1987 | Hamazaki et al. |
| 4,706,168 A | 11/1987 | Weisner |
| 4,707,647 A | 11/1987 | Coldren et al. |
| 4,728,195 A | 3/1988 | Silver |
| 4,730,260 A | 3/1988 | Mori et al. |
| 4,731,858 A | 3/1988 | Grasmueller et al. |
| 4,736,437 A | 4/1988 | Sacks et al. |
| 4,742,551 A | 5/1988 | Deering |
| 4,752,898 A | 6/1988 | Koenig |
| 4,758,782 A | 7/1988 | Kobayashi |
| 4,764,870 A | 8/1988 | Haskin |
| 4,771,469 A | 9/1988 | Wittenburg |
| 4,776,027 A | 10/1988 | Hisano et al. |
| 4,782,238 A | 11/1988 | Radl et al. |
| 4,783,826 A | 11/1988 | Koso |
| 4,783,828 A | 11/1988 | Sadjadi |
| 4,783,829 A | 11/1988 | Miyakawa et al. |
| 4,809,077 A | 2/1989 | Norita et al. |
| 4,821,333 A | 4/1989 | Gillies |
| 4,831,580 A | 5/1989 | Yamada |
| 4,860,374 A | 8/1989 | Murakami et al. |
| 4,860,375 A | 8/1989 | McCubbrey et al. |
| 4,876,457 A | 10/1989 | Bose |
| 4,876,728 A | 10/1989 | Roth |
| 4,891,767 A | 1/1990 | Rzasa et al. |
| 4,903,218 A | 2/1990 | Longo et al. |
| 4,907,169 A | 3/1990 | Lovoi |
| 4,908,874 A | 3/1990 | Gabriel |
| 4,912,559 A | 3/1990 | Ariyoshi et al. |
| 4,912,659 A | 3/1990 | Liang |
| 4,914,553 A | 4/1990 | Hamada et al. |
| 4,922,543 A | 5/1990 | Ahlbom et al. |
| 4,926,492 A | 5/1990 | Tanaka et al. |
| 4,932,065 A | 6/1990 | Feldgajer |
| 4,953,224 A | 8/1990 | Ichinose et al. |
| 4,955,062 A | 9/1990 | Terui |
| 4,959,898 A | 10/1990 | Landman et al. |
| 4,962,423 A | 10/1990 | Yamada et al. |
| 4,972,359 A | 11/1990 | Silver et al. |
| 4,982,438 A | 1/1991 | Usami et al. |
| 5,005,126 A | 4/1991 | Haskin |
| 5,012,402 A | 4/1991 | Akiyama |
| 5,012,433 A | 4/1991 | Callahan et al. |
| 5,012,524 A | 4/1991 | LeBeau |
| 5,027,419 A | 6/1991 | Davis |
| 5,046,190 A | 9/1991 | Daniel et al. |
| 5,054,096 A | 10/1991 | Beizer |
| 5,060,276 A | 10/1991 | Morris et al. |
| 5,063,608 A | 11/1991 | Siegel |
| 5,073,958 A | 12/1991 | Imme |
| 5,077,806 A * | 12/1991 | Peters et al. ............... 382/141 |
| 5,081,656 A | 1/1992 | Baker et al. |
| 5,081,689 A | 1/1992 | Meyer et al. |
| 5,083,073 A | 1/1992 | Kato |
| 5,086,478 A | 2/1992 | Kelly-Mahaffey et al. |
| 5,090,576 A | 2/1992 | Menten |
| 5,091,861 A | 2/1992 | Geller et al. |
| 5,091,968 A | 2/1992 | Higgins et al. |
| 5,093,867 A | 3/1992 | Hori et al. |
| 5,113,565 A | 5/1992 | Cipolla et al. |
| 5,115,309 A | 5/1992 | Hang |
| 5,119,435 A | 6/1992 | Berkin |
| 5,124,622 A | 6/1992 | Kawamura et al. |
| 5,133,022 A | 7/1992 | Weideman |
| 5,134,575 A | 7/1992 | Takagi |
| 5,143,436 A | 9/1992 | Baylor et al. |
| 5,145,432 A | 9/1992 | Midland et al. |
| 5,151,951 A | 9/1992 | Ueda et al. |
| 5,153,925 A | 10/1992 | Tanioka et al. |
| 5,155,775 A | 10/1992 | Brown |
| 5,159,281 A | 10/1992 | Hedstrom et al. |
| 5,159,645 A | 10/1992 | Kumagai |
| 5,164,994 A | 11/1992 | Bushroe |
| 5,168,269 A | 12/1992 | Harlan |
| 5,175,808 A | 12/1992 | Sayre |
| 5,179,419 A | 1/1993 | Palmquist et al. |
| 5,185,810 A | 2/1993 | Freischlad |
| 5,185,855 A | 2/1993 | Kato et al. |
| 5,189,712 A | 2/1993 | Kajiwara et al. |
| 5,204,944 A | 4/1993 | Wolberg et al. |
| 5,206,820 A | 4/1993 | Ammann et al. |
| 5,216,503 A | 6/1993 | Paik |
| 5,225,940 A | 7/1993 | Ishii et al. |
| 5,230,027 A | 7/1993 | Kikuchi |
| 5,243,607 A | 9/1993 | Masson et al. |
| 5,253,306 A | 10/1993 | Nishio |
| 5,253,308 A | 10/1993 | Johnson |
| 5,265,173 A | 11/1993 | Griffin et al. |
| 5,271,068 A | 12/1993 | Ueda et al. |
| 5,287,449 A | 2/1994 | Kojima |
| 5,297,238 A | 3/1994 | Wang et al. |
| 5,297,256 A | 3/1994 | Wolstenholme et al. |
| 5,299,269 A | 3/1994 | Gaborski et al. |
| 5,307,419 A | 4/1994 | Tsujino et al. |
| 5,311,598 A | 5/1994 | Bose et al. |
| 5,315,388 A | 5/1994 | Shen et al. |
| 5,319,457 A | 6/1994 | Nakahashi et al. |
| 5,327,156 A | 7/1994 | Masukane et al. |
| 5,329,469 A | 7/1994 | Watanabe |
| 5,337,262 A | 8/1994 | Luthi et al. |
| 5,337,267 A | 8/1994 | Colavin |
| 5,363,507 A | 11/1994 | Nakayama et al. |
| 5,367,439 A | 11/1994 | Mayer et al. |
| 5,367,667 A | 11/1994 | Wahlquist et al. |
| 5,371,690 A | 12/1994 | Engel et al. |
| 5,371,836 A | 12/1994 | Mitomi et al. |
| 5,388,197 A | 2/1995 | Rayner |
| 5,388,252 A | 2/1995 | Dreste et al. |
| 5,398,292 A | 3/1995 | Aoyama |
| 5,432,525 A | 7/1995 | Maruo et al. |
| 5,440,699 A | 8/1995 | Farrand et al. |
| 5,455,870 A | 10/1995 | Sepai et al. |
| 5,455,933 A | 10/1995 | Schieve et al. |
| 5,471,312 A | 11/1995 | Watanabe et al. |
| 5,475,766 A | 12/1995 | Tsuchiya et al. |
| 5,475,803 A | 12/1995 | Stearns et al. |
| 5,477,138 A | 12/1995 | Erjavic et al. |
| 5,481,712 A | 1/1996 | Silver et al. |
| 5,485,570 A | 1/1996 | Bushboom et al. |
| 5,491,780 A | 2/1996 | Fyles et al. |
| 5,495,424 A | 2/1996 | Tokura |
| 5,495,537 A | 2/1996 | Bedrosian et al. |
| 5,496,106 A | 3/1996 | Anderson |
| 5,500,906 A | 3/1996 | Picard et al. |
| 5,506,617 A | 4/1996 | Parulski et al. |
| 5,506,682 A | 4/1996 | Pryor |
| 5,511,015 A | 4/1996 | Flockencier |
| 5,519,840 A | 5/1996 | Matias et al. |
| 5,526,050 A | 6/1996 | King et al. |
| 5,528,703 A | 6/1996 | Lee |
| 5,532,739 A | 7/1996 | Garakani et al. |
| 5,539,409 A | 7/1996 | Mathews et al. |

| | | |
|---|---|---|
| 5,543,915 A * | 8/1996 | Csipkes et al. ............. 356/477 |
| 5,544,256 A | 8/1996 | Brecher et al. |
| 5,548,326 A | 8/1996 | Michael |
| 5,550,763 A | 8/1996 | Michael |
| 5,550,888 A | 8/1996 | Neitzel et al. |
| 5,553,859 A | 9/1996 | Kelly et al. |
| 5,557,410 A | 9/1996 | Huber et al. |
| 5,557,690 A | 9/1996 | O'Gorman et al. |
| 5,563,962 A * | 10/1996 | Peters et al. ................ 382/261 |
| 5,566,877 A | 10/1996 | McCormack |
| 5,568,563 A | 10/1996 | Tanaka et al. |
| 5,574,668 A | 11/1996 | Beaty |
| 5,574,801 A | 11/1996 | Collet-Beillon |
| 5,581,632 A | 12/1996 | Koljonen et al. |
| 5,583,949 A | 12/1996 | Smith et al. |
| 5,583,954 A | 12/1996 | Garakani |
| 5,586,058 A | 12/1996 | Aloni et al. |
| 5,592,562 A | 1/1997 | Rooks |
| 5,594,859 A | 1/1997 | Palmer et al. |
| 5,602,937 A | 2/1997 | Bedrosian et al. |
| 5,608,490 A | 3/1997 | Ogawa |
| 5,608,872 A | 3/1997 | Schwartz et al. |
| 5,640,199 A | 6/1997 | Garakani et al. |
| 5,640,200 A | 6/1997 | Michael |
| 5,642,158 A | 6/1997 | Petry, III et al. |
| 5,647,009 A | 7/1997 | Aoki et al. |
| 5,649,032 A | 7/1997 | Burt et al. |
| 5,657,403 A | 8/1997 | Wolff et al. |
| 5,673,334 A | 9/1997 | Nichani et al. |
| 5,675,358 A | 10/1997 | Bullock et al. |
| 5,676,302 A | 10/1997 | Petry, III |
| 5,684,530 A | 11/1997 | White |
| 5,696,848 A | 12/1997 | Patti et al. |
| 5,715,369 A | 2/1998 | Spoltman et al. |
| 5,715,385 A | 2/1998 | Stearns et al. |
| 5,717,785 A | 2/1998 | Silver |
| 5,724,439 A | 3/1998 | Mizuoka et al. |
| 5,734,807 A | 3/1998 | Sumi |
| 5,740,285 A | 4/1998 | Bloomberg et al. |
| 5,742,037 A | 4/1998 | Scola et al. |
| 5,751,853 A | 5/1998 | Michael |
| 5,754,679 A | 5/1998 | Koljonen et al. |
| 5,757,956 A | 5/1998 | Koljonen et al. |
| 5,761,326 A | 6/1998 | Brady et al. |
| 5,761,337 A | 6/1998 | Nishimura et al. |
| 5,768,443 A | 6/1998 | Michael et al. |
| 5,793,899 A | 8/1998 | Wolff et al. |
| 5,796,386 A | 8/1998 | Lipscomb et al. |
| 5,796,868 A | 8/1998 | Dutta-Choudhury |
| 5,801,966 A | 9/1998 | Ohashi |
| 5,805,722 A | 9/1998 | Cullen et al. |
| 5,809,658 A | 9/1998 | Jackson et al. |
| 5,818,443 A | 10/1998 | Schott |
| 5,822,055 A | 10/1998 | Tsai et al. |
| 5,825,483 A | 10/1998 | Michael et al. |
| 5,825,913 A | 10/1998 | Rostami et al. |
| 5,835,099 A | 11/1998 | Marimont |
| 5,835,622 A | 11/1998 | Koljonen et al. |
| 5,845,007 A | 12/1998 | Ohashi et al. |
| 5,847,714 A | 12/1998 | Naqvi et al. |
| 5,848,189 A | 12/1998 | Pearson et al. |
| 5,850,466 A * | 12/1998 | Schott ........................ 382/141 |
| 5,859,923 A | 1/1999 | Petry, III et al. |
| 5,861,909 A | 1/1999 | Garakani et al. |
| 5,872,870 A * | 2/1999 | Michael ..................... 382/291 |
| 5,878,152 A | 3/1999 | Sussman |
| 5,900,975 A | 5/1999 | Sussman |
| 5,901,241 A | 5/1999 | Koljonen et al. |
| 5,909,504 A | 6/1999 | Whitman |
| 5,912,768 A | 6/1999 | Sissom et al. |
| 5,912,984 A | 6/1999 | Michael et al. |
| 5,918,196 A | 6/1999 | Jacobson |
| 5,933,523 A | 8/1999 | Drisko et al. |
| 5,943,441 A | 8/1999 | Michael |
| 5,949,901 A | 9/1999 | Nichani et al. |
| 5,974,169 A | 10/1999 | Bachelder |
| 6,002,738 A | 12/1999 | Cabral et al. |
| 6,016,152 A | 1/2000 | Dickie |
| 6,069,668 A | 5/2000 | Woodham, Jr. et al. |
| 6,456,339 B1 * | 9/2002 | Surati et al. ................ 348/745 |

FOREIGN PATENT DOCUMENTS

| | | |
|---|---|---|
| EP | 0 527 632 A2 | 2/1993 |
| EP | 0 777 381 A2 | 11/1996 |
| EP | 0 341 122 A1 | 4/1999 |
| FR | 2 598 019 | 4/1986 |
| WO | WO 95/21376 | 8/1995 |
| WO | WO 95/22137 | 8/1995 |
| WO | WO 97/21189 | 6/1997 |
| WO | WO 97/22858 | 6/1997 |
| WO | WO 97/24692 | 7/1997 |
| WO | WO 97/24693 | 7/1997 |
| WO | WO 98/30890 | 7/1998 |
| WO | WO 98/52349 | 11/1998 |
| WO | WO 98/59490 | 12/1998 |
| WO | WO 99/15864 | 4/1999 |

OTHER PUBLICATIONS

Chapter 3: "Guidelines for Developing MMX Code," Intel.
Chapter 4: "MMX Code Development Strategy," Intel.
Chapter 5: "MMX Coding Techniques," Intel.
Chapter 3: "Optimization Techniques for Integer Blended Code," Intel.
"Geometrical Image Modification," pp. 421-442.
Gevorkian David Z., Astola Jaakko T., and Atourian Samvel M. "Improving Gil-Werman Algorithm for Running Min and Max Filters" IEEE Transactions on Pattern Analysis and Machine Intelligence, vol. 19, No. 5, May 1997, pp. 526-529.
Gil, Joseph and Werman Michael. "Computing 2-D Min, Median, and Max Filters" IEEE Transactions on Pattern Analysis and Machine Intelligence, vol. 15, No. 5, May 1993, pp. 504-507.
Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.
Horn, Berthold Klaus Paul. "Robot Vision", The Massachusetts Institute for Technology, 1986.
Medina-Mora et al. (1981) An Incremental Programming Environment, IEEE Transactions on Software Eng. SE-7: 472-482.
NEC Electronics Inc., PD7281 Image Pipelined Processor, Product Information Brochure, pp. 2-169-2-211.
Newsletter from Acquity Imaging, Inc., "Remote Vision Support Package—The Phones Are Ringing!," 1 page.
PictureTel Corporation Product Brochure "PictureTel Live PCS 100(tm) Personal Visual Communications System," 3 pp. (1993).
PictureTel Corporation Product Brochure "PictureTel System 1000: Complete Videoconferencing for Cost Sensitive Applications," 4 pp. (1993).
PictureTel Corporation Product Brochure, "PictureTel System 4000(tm) A Family of Models to Fit Your Application From Offices to Boardrooms, Classrooms, and Auditoriums," 4 pp. (1993).
Plessey Semiconductors, Preliminary Information, May 1986, Publication No. PS2067 , May 1986, pp. 1-5.
Pratt, William K. Digital Image Processing (2nd Ed.), 1991, pp. 421-445.

Racca Roberto G., Stephenson Owen, and Clements Reginald M. High-speed video analysis system using multiple shuttered charge-coupled device imagers and digital storage. Optical Engineering (Jun. 1992) 31;6.

Ray, R. "Automated inspection of solder bumps using visual signatures of specular image-highlights," Computer Vision and Pattern Recognition, 1989. Proceedings CVPR '89. Pp. 588-596.

Rosenfeld, Azriel. "Computer Vision: Basic Principles," Proceedings of the IEEE. vol. 76, No. 8, Aug. 1988. pp. 863-868.

Symantec Corporation, "The Norton pcAnywhere User's Guide," Table of Contents 8 pp; Introduction of pcAnywhere Technology pp i-vii; Chapter 7—Sessions; pp. 191-240 (1991).

Teitelbaum et al. (19810 The Cornell Program Synthesizer: A Syntax-Directed Programming Environment, Communications of the ACM 24:563-573.

Tsai, Roger Y. "A Versatile Camera Calibration Technique for High-Accuracy 3D Mahcine Vision Metrology Using Off-the-Shelf TV Cameras and Lenses," The Journal of Robotics and Automation, vol. RA-3, No. 4, Aug. 1987, pp. 323-344.

Tsai, Roger Y. "An Efficient and Accurate Camera Calibration Technique for 3D Machine Vision," Proceedings IEEE Conference on Computer Vision and Pattern Recognition Jun. 22-26, 1986, pp. 364-374.

Turney, Jerry L. "Recognizing Partially Occluded Parts," IEEE Transactions on Pattern Analysis and Machine Intelligence, PAMI-7 (1985) Jul., No. 4, pp. 410-421.

Unser, Michael. "Convolution-Based Interpolation for Fast, High-Quality Rotation of Images," IEEE Transactions on Image Processing vol. 4 No. 10 (Oct. 1995) pp. 1371 1381.

Viitanen, Jouko, et al. "Hierarchical pattern matching with an efficient method for estimating rotations," Proceedings IECON '87 International Conference on Industrial Electronics, Control, and Instrumentation, Nov. 3-6, 1987, 6 pp.

Wu, Yifeng and Maitre, Henri. "Registration of a SPOT Image and a SAR Image Using Multiresolution Representation of a Coastline," 10th International Conference on Pattern Recognition Jun. 16-21, 1990, pp. 913-917.

* cited by examiner

MACHINE VISION METHOD AND APPARATUS FOR THRESHOLDING IMAGES OF NON-UNIFORM MATERIALS

FIELD OF THE INVENTION

The present invention relates generally to machine vision and, more particularly, to thresholding images. The invention has application, for example, in imaging and analyzing non-woven and other materials with high-frequency gray-scale variation, e.g., for irregularities and defects.

BACKGROUND OF THE INVENTION

In machine vision, image enhancement techniques are used to process image data to facilitate operator and automated analysis. Commonly known image enhancement techniques can be divided into two broad classes: point transforms and neighborhood operations. Point transform algorithms are ones in which each output pixel is generated as a function of a corresponding input pixel. Neighborhood operations generate each output pixel as a function of several neighboring input pixels. Neighborhood size is often 3×3, 5×5, though it can be larger, smaller or shaped otherwise, in accord with requirements of a particular application.

Thresholding is an image enhancement technique for reducing the number of intensity, brightness or contrast levels in an image. It is typically used to convert a gray scale image, with up to 256 gray levels, to a binary image, with just two levels (e.g., black and white). If a pixel intensity value exceeds a threshold (or is outside a threshold range), it is converted to a value that represents "white" (or potential defect); otherwise, it is converted to a value that represents "black" (or "background"). Threshold levels can be set at a fixed gray level for an image (level thresholding), or can be based on a variety of other measures, e.g., they can be set relative to an average gray scale level for a region (base line thresholding).

Thresholding is commonly used in machine vision systems to facilitate detection of defects. Prior art techniques, however, do not perform very well on non-woven materials, such as disposable diaper fabrics. When these materials are backlit and image at high resolution, both embossing and normal variation in the material's "formation" (the structure of the material's fibers) can appear at the pixel level as small holes and/or thin spots amidst thicker, more solid regions. This makes it difficult to discern them from actual defects.

Traditionally, inspection system providers have solved the problem of inspecting such materials in one of two ways. They either image the materials at low camera resolutions, so minute variations in the materials are effectively lost, or they opto/mechanically defocus the camera lens, blurring the material variations to achieve somewhat the same effect. Both these techniques result in poor image quality and, therefore, cannot be used in applications where high-resolution images must be displayed, e.g., for operator evaluation. Moreover, both result in a loss of valuable image data at the acquisition stage and, therefore, preclude further automated analysis.

In view of the foregoing, an object of the invention is to provide improved methods and apparatus for machine vision. A more particular object is to provide improved methods and apparatus for thresholding images.

A related aspect of the invention is to provide such methods and apparatus as facilitate imaging and analysis of defects (or other features) in images.

A further aspect of the invention is to provide such methods and apparatus as facilitate the inspection of non-woven and other materials with high-frequency variations of intensity, brightness, color or contrast.

Yet another object of the invention is to provide such methods and apparatus as can be readily implemented at low cost with existing machine vision software and/or hardware.

SUMMARY OF THE INVENTION

The foregoing are among the objects attained by the invention which provides, in one aspect, machine vision inspection methods that take an average (or other such statistical measure) of pixel values within each of selected "neighborhoods" or groups of pixels within an image. The averages—effectively, digitally "defocused" pixels—are threshold and the results output for display or further analysis.

Such methods are advantageous because an originally acquired, high-resolution (non-defocused) image can be preserved and processed in parallel with a neighborhood-based defocused and thresholded image. Systems employing these methods achieve the thresholding capability of traditional defocused systems, while providing clear, detailed, high-resolution images for display or other analysis. Such systems provide this dual capability using image data acquired for a single camera or camera array.

A method as described above can be used, for example, for inspection of webs of baby diaper "fabric." An arithmetic average is generated for each M×N unique (but overlapping) neighborhood of pixels in an image of the fabric. The averages, again, representing "defocused" pixels, are compared with a threshold (or threshold range)for the fabric as a whole. Averages that exceed the thresholds are set to one value (e.g., "white," representing potential defect pixels); otherwise they are set to another value (e.g., "black," representing background). An image consisting of these thresholded, defocused values—each positioned in accord with the location of its respective neighborhood in the original image—can be displayed or used for inspection of the web.

Further aspects of the invention provide methods as described above in which an image consisting of the thresholded, defocused values is displayed superimposed on, or otherwise in conjunction with, the originally acquired image. Related aspects provide for display with image that is thresholded on a traditional per pixel basis.

Yet further aspects of the invention provide methods as described above in which the aforementioned threshold (or threshold range) is not fixed for the image as a whole but, rather, varies along the image. For example, the defocused pixel value for each neighborhood can be compared to a threshold based on an average pixel intensity for a larger region in which that neighborhood resides. In the diaper fabric example above, such a method can be used to compensate for slowly changing variations in web color or brightness over an entire roll of web.

Still further aspects of the invention provide machine vision apparatus that operate in accord with the methods described above. An apparatus according to one such aspect includes a filter that generates an average pixel value of a M-column by N-row neighborhood. The filter includes a down delay memory that holds each pixel entering the filter ("new pixel value") for a specified period. A down accumulator having J storage elements, where J is a number of columns in the acquired image, maintains a sum of N rows of pixels values for each of J corresponding columns of the image.

The filter further includes down accumulator logic that updates the down accumulators with each new pixel value received by the filter: adding the new pixel value to a sum maintained by the down accumulator for the column with which the new pixel value is associated, subtracting therefrom a pixel value output by the down delay memory for that same column, and storing a result ("new down-sum") back into that down accumulator.

Moreover, the filter includes an M-element cross delay memory that holds each newly calculated, per column down-sum for a specified period before outputting it to cross accumulator logic. That logic adds the newly calculated down-sum to a sum maintained in a cross accumulator, subtracts therefrom the "old" down-sum output by the cross delay memory, and stores the result ("new cross-sum") back to the cross accumulator. Newly calculated cross-sum values represent a sum of pixels values for the current M-column by N-row rectangular neighborhood. Upon division by the product M * N, these are the defocused, neighborhood based pixel values discussed above.

These and other aspects of the invention are evident in the attached drawings and in the description and claims that follow.

Methods and apparatus according to the invention have utility in machine vision apparatus used in industry, research and other areas of pursuit. Such methods and apparatus facilitate the rapid and accurate inspection of non-woven and other materials or scenes with a high degree of color, contrast, intensity or brightness variations at the pixel level. In addition, they facilitate low-cost simultaneous generation and/or use of corresponding unfiltered or per-pixel thresholded images.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
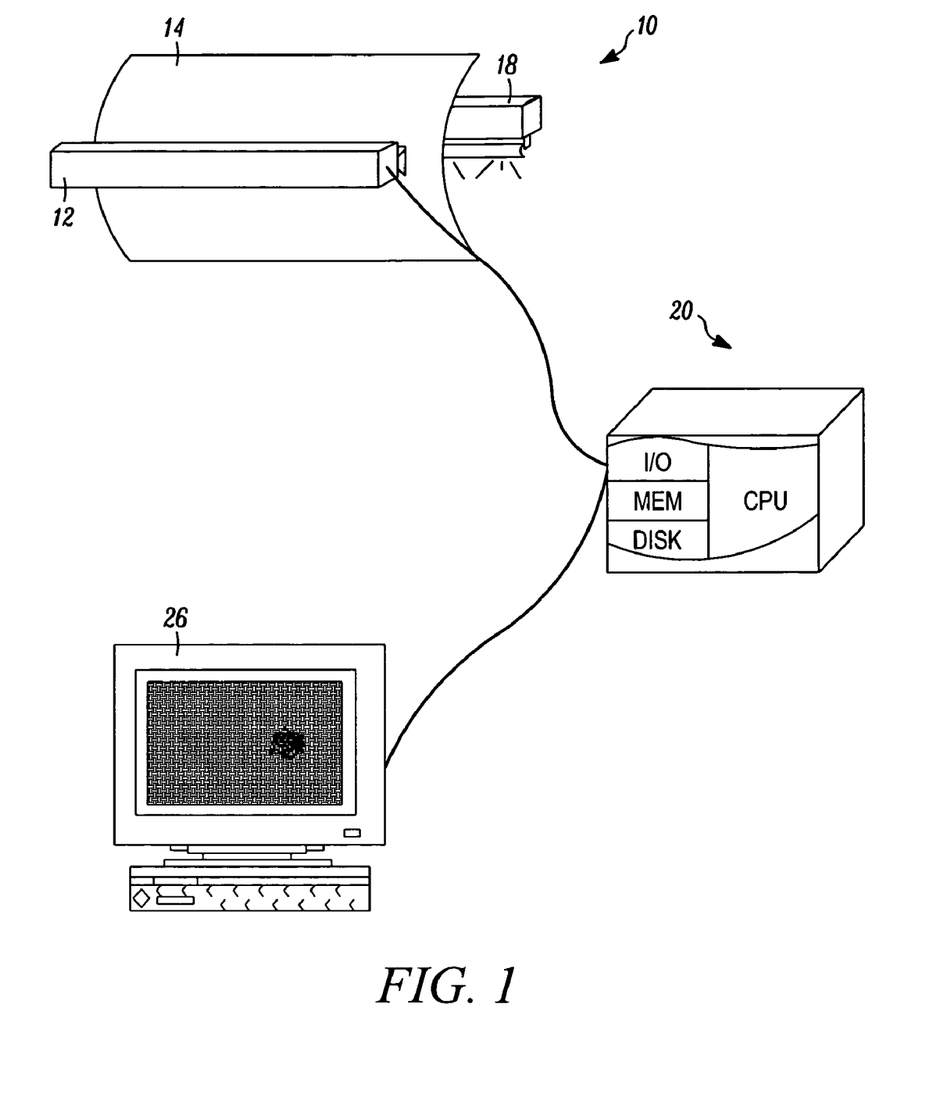
FIG. 1 is a schematic of machine vision system of the type used to practice the invention.

FIG. 1 depicts a machine vision system 10 of the type with which the invention is practiced. The system includes an image acquisition device 12 that generates an image of an object 14 under inspection. The illustrated device 12 is a linear camera of the type conventionally used in machine vision for the inspection of a web or other moving object, though, the invention is suitable for practice with any manner or type of image acquisition devices. Illustrated object 14 is shown as a web, e.g., a sheet diaper fabric, under manufacture and moving in front of backlight 18, all in the conventional manner. Though particularly suited for inspection of non-woven or other materials or scenes with a high degree on intensity, color, contrast or brightness variations at the pixel (or other small-scale) level, it can be used for display and/or analysis of any acquired image.

Digital image data (or pixels) generated by the acquisition device 12 represent, in the conventional manner, the image intensity (e.g., color, contrast or brightness) of each point in the field of view of the device 12. That digital image data is transmitted from capturing device 12 to image analysis system 20. This can be a conventional digital data processor, or a vision processing system of type commercially available from the assignee hereof, Cognex Corporation, as outfitted and/or programmed in accord with the teachings hereof. The image analysis system 20 may have one or more central processing units (CPU), memory units (Mem), input-output sections (I/O), and storage devices (Disk), all of the conventional type. Those skilled in the art will appreciate that, in addition to implementation on a programmable digital data processor, the methods and apparatus taught herein can be implemented in special purpose hardware.

Illustrated image analysis system 20 is coupled to a display device 26 of the conventional type and in the conventional manner. In the drawing, this is employed to illustrate one practice of the invention. An image acquired by device 12 is output to and display on device 26, e.g., with image magnification and/or color and contrast enhancement, all in the conventional manner. Superimposed thereon is a form of the image processed in the manner described below to digitally defocus and threshold the pixels on a neighborhood basis.

In a preferred practice of the invention, the image that has been processed to digitally defocus and threshold the pixels on a neighborhood basis is routed for further automated image analysis. That image alone or, preferably, in combination with the originally acquired, high resolution, unfiltered image, can be used in such automated analysis for highly accurate, automated detection of defects in a manner that avoids the misidentification of normal regions of the image as defective.

Figure 2A:
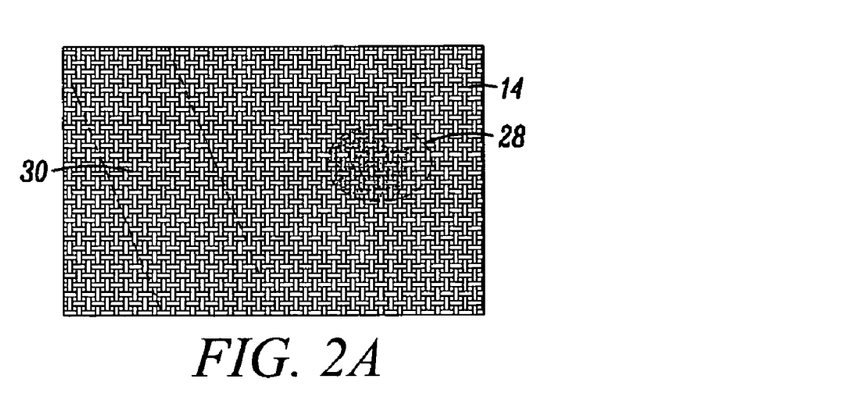
FIG. 2(a) shows a raw image of the type processed by the system of FIG. 1.
Figure 2B:
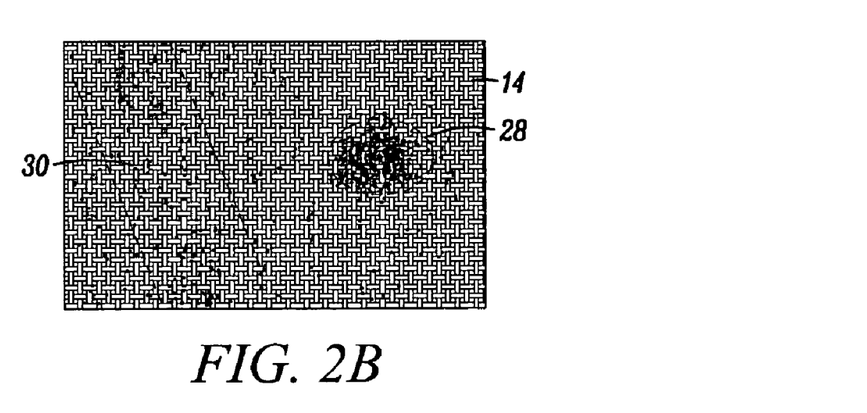
FIG. 2(b) shows the effect of conventional per-pixel thresholding on an image of the type shown in FIG. 2(a)
Figure 2C:
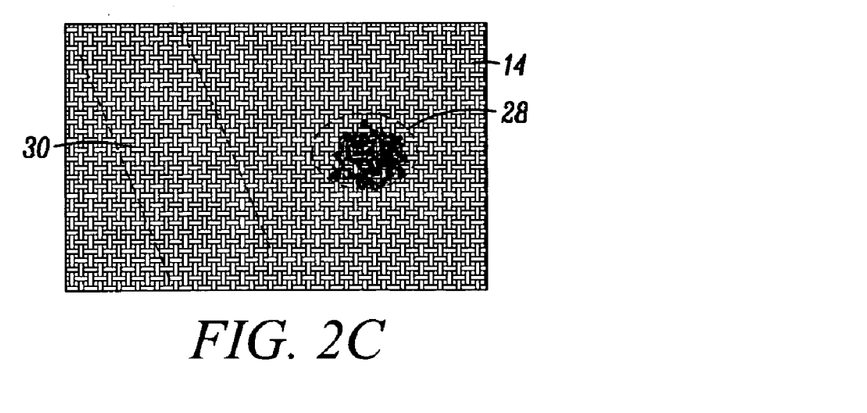
FIG. 2(c) shows the effect of digital defocusing and threshold on a neighborhood basis on an image of the type shown in FIG. 2(a)

A further understanding of the illustrated system may be attained by reference to FIGS. 2(a)–2(c). FIG. 2(a) shows an image acquired from device 12 of web 14, with only magnification and/or color and contrast enhancement. Region 28 identifies a clump or other defect in the web. Area 30 indicates a region of normal acceptable material formation.

FIG. 2(b) shows the effect of conventional per-pixel thresholding on the image of FIG. 2(a). As shown by the agglomeration of dark dots, this thresholding technique highlights the defect in region 28. However, normal intensity variations in the region 30 of the web result in improper thresholding and highlighting of pixels there, as well as at other locations dispersed about the image. Though additional image processing (e.g., erosion) can be performed on threshold image of FIG. 2(b) in order to eliminate some of this false highlighting, that would also tend to de-emphasize the otherwise desirable highlighting in region 28.

FIG. 2(c) is an expanded view of the image on display device 26 and shows the effect of defocusing and thresholding on a neighborhood basis in accord with the teachings hereof. Again, an agglomeration of dark in region 28 reveals the defect there, yet, with more emphasis than shown above. Moreover, unlike the conventional per-pixel technique, there is little or no highlighting in the region 30 or in the other non-defective regions of the web.

Comparing FIGS. 2(a)–2(c), those skilled in the art will appreciate that the dark pixels of FIGS. 2(b)–2(c) are superimposed over the original image (of FIG. 2(a)) to identify pixels that have exceeded a threshold. Normally, such superposition would be displayed in color, e.g., red.

Those skilled in the art will appreciate that FIGS. 2(a)–2(c) show just one application of the invention, and that in other applications defocusing and thresholding on a neighborhood basis can result in more or less highlighting than conventional per-pixel techniques, e.g., depending on the intended application and how thresholds are set and used.

Figure 3:
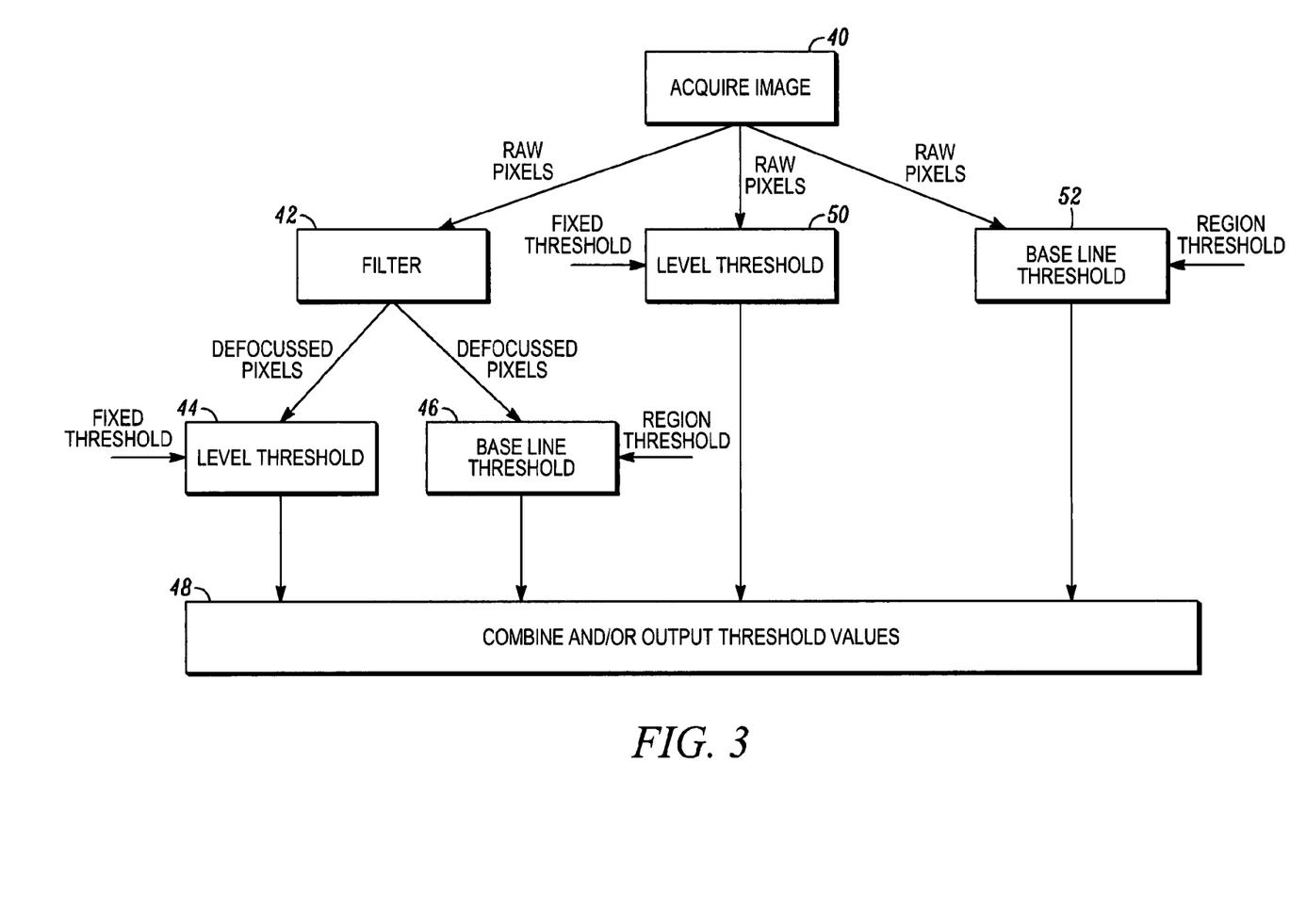
FIG. 3 is a flow chart depicting operation of the system 10 of FIG 1.

FIG. 3 is a diagram depicting operation of the system 10 of FIG. 1. In step 40, an image captured by device 12 is passed to image analysis system 20 for processing. This step is performed in the conventional manner.

In step 42, the stream of pixels for the acquired image is passed through a filter that digitally defocuses them on a neighborhood basis. In the illustrated embodiment, the filter is an arithmetic mean filter operating with a neighborhood (or window) size of 2×2, 2×3, 3×2, 3×3, 3×4, 4×3, 4×4, or any other size or shape (e.g., approximated circle) suitable to the inspection task at hand.

Preferably, the neighborhoods are rectangular and contain either a total pixel count that is a factor of two or, alternately, have a width and height that are each a factor of two. This facilitates performing divisions required for averaging. The invention is not limited to arithmetic mean filters and may, instead, use filters that provide any statistical measure or low-pass filtering of pixel contrast, color, brightness, or intensity with the respective neighborhoods.

The result of the filtering step 42 is a stream of "defocused" pixels, each of which represents an average (or other statistical measure) of the neighborhood of pixels surrounding (and including) each pixel of the acquired image. In essence, the filtering step 42 has the effect of defocusing pixels in the acquired image, blurring them to the extent that small variations are not noticeable. This does not deteriorate the sharpness of the image features larger than the filter window, yet it significantly attenuates noise, insignificant variations and features smaller than the neighborhood or window size. Details of a preferred filtering operation are discussed below and shown in FIG. 4.

In steps 44 and 46, the defocused pixels are thresholded. Thresholding step 44 involves comparison of each of the defocused pixels with a level threshold or range, set empirically or otherwise, for the entire acquired image. Defocused pixels values that exceed the thresholds are set to one value (e.g., "white," representing potential defect pixels); otherwise they are set to another value (e.g., "black," representing background). These resultant values can, themselves, can be regarded as pixels having a binary value (e.g., black/white, 0/1, defect/background, etc.).

Thresholding step 46 operates similarly, although it uses a base line threshold that varies along the image. Determination of the threshold is accomplished in the conventional manner of the art. For example, in the illustrated embodiment, a running average of pixel intensities over a region—e.g., 128×128 pixels—is maintained, e.g., utilizing accumulators of the type described below, or in software executing in the CPU of device 20. Those running averages are used in the thresholding step 46, as indicated by the arrows.

As noted, the illustrated embodiment utilizes two thresholding steps: level (step 44) and base line (step 46). Those skilled in the art will appreciate that one or both of these steps can be performed, depending upon application at hand. Moreover, it will appreciated that other thresholding steps can be performed instead or in addition. Further, as discussed below, in embodiments where filtering step 42 does not include a division operation (e.g., pixel value sums for each neighborhood are not divided by the number of pixels in the neighborhood), the thresholding steps 44, 46 can employ threshold values that are scaled commensurately larger (e.g., the threshold values are multiplied by the number of pixels in the neighborhoods). Regardless of how performed, the result of the thresholding steps 44, 46 is a stream of binary pixel values that represent thresholding of the defocused pixels in each neighborhood of the acquired image.

In step 48, the binary pixels from the thresholding steps are output for display, e.g., in the manner shown in display 26 or FIG. 1, and/or for further processing. In the either event, those binary pixels can be combined with one another (e.g., via an OR operation), as well as with binary pixels from the conventional per-pixel thresholding operations 50, 52. Moreover, the results can be used to isolate and identify defects in the acquired image.

Concurrent with generation of the binary pixel values based on the defocused, neighborhood-based pixel values, the method utilizes conventional techniques to threshold the stream of pixels from the acquired image on a per-pixel basis. See, steps 50, 52. These steps operate in the conventional manner known in the art, using thresholds set in the manner described in steps 44, 46, above (though these thresholds need not have the same values as those used in the prior steps). Thresholded pixel values resulting from steps 50, 52 can be used as described above.

In a preferred embodiment, the stream of pixels from the acquired image are also processed using "streak processing" thresholding techniques of the type known in the art. These are intended to discern streak-like defects occurring along the direction of motion of web 12 that might otherwise escape emphasis via the thresholding techniques performed in steps 42–52. Those skilled in the art will appreciate still other thresholding techniques may be utilized, and their results displayed and/or combined with the other threshold values as above.

Hardware and/or software-based delay mechanisms of the type known in the art can be employed to align the acquired image and the aforementioned binary threshold images on a per pixel basis.

Figure 4:
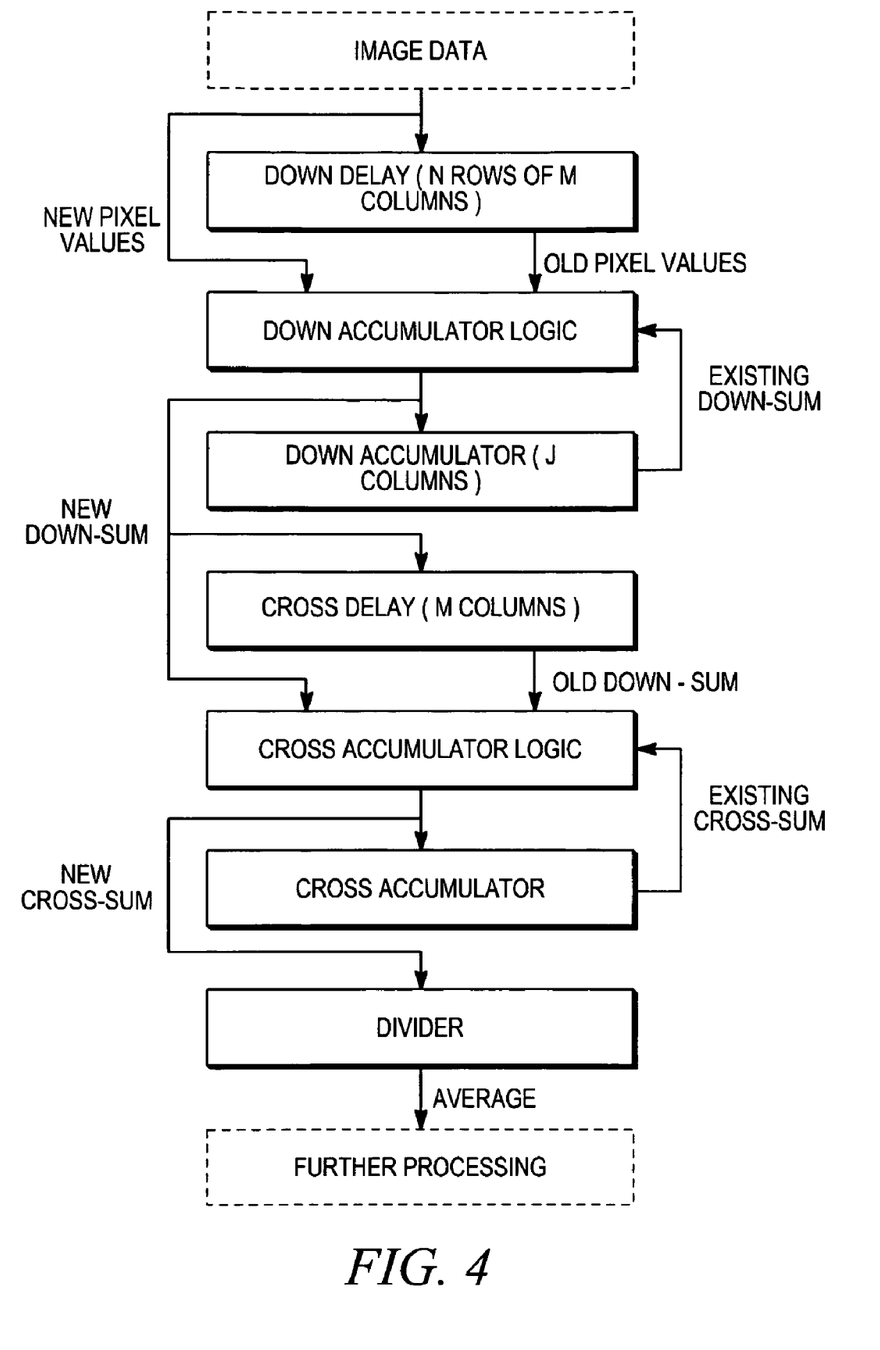
FIG. 4 depicts operation of a preferred filter used in practice of the invention.

FIG. 4 depicts a preferred implementation of the filter whose operation is discussed above. In the drawing, the acquired image comprises rows (lines) of pixel data, each row containing J columns of pixels. Each pixel is an 8-bit value representing a gray level, where 0 is black and 255 is white. The image streams in continuously (i.e., it is not limited in the number of rows it can contain), but for the sake of discussion, we can say it consists of K rows of data. The image is processed as a continuous stream of pixel data, with the pixels in each row following the pixels of the previous row.

An arithmetic mean filter calculates the average pixel value of every unique M-column by N-row rectangular sub-image (neighborhood) within a given image (including overlapping sub-images). In effect, the pixel values in each M by N sub-image are added together, then that resultant sum is divided by the number of pixels in the sub-image (the product (M * N)). The result is a value that is the average of the pixel values in the sub-image.

If these average values are arranged in columns and rows corresponding to the relative position of their respective sub-images in the original image, the average values themselves make up an image, smaller than the original image ((J-M+1) columns, (K-N+1) rows).

In a preferred embodiment, running averages are used so that each pixel in the original image is referenced the fewest times possible.

A pixel stream enters the arithmetic mean filter. A down delay is a memory (e.g., FIFO or RAM) that holds each pixel value entering it (or stored to it) for N rows, before outputting (or accessing) the same pixel value. In other words, as each pixel is stored to the down delay, it is held, then referenced (J * N) pixels later. We can call each pixel value entering the down delay a "new" pixel value, and each pixel exiting the down delay an "old" pixel value.

A down accumulator is a memory containing one storage element for each of the J columns in the image. Each memory element has sufficient data bits to hold the maximum sum of N image pixel values (the maximum sum of an N-row high column of pixel values in the sub-image). The value stored for each column is called a down-sum, and represents the sum of N rows of image pixel values in that column.

During operation, for each column, the down accumulator logic takes an existing down-sum from the down accumulator, subtracts off the old (delayed) image pixel value for the column, adds in the new image pixel value for the column, and stores the new down-sum back in the down accumulator. For each new incoming row in the image, new per-column down-sums are calculated, using this running average method.

To initialize the down accumulator upon startup, the process takes place as describe above, with the accumulator logic forcing the existing down-sum to zero for every column in the first row, and forcing the old image pixel value to zero for every column in the first N rows. This allows the down accumulator to initialize by summing together the first N rows of image pixels in each column before performing a running average. Note that the down-sums in the down accumulator are not valid for the first (N-1) rows.

As each newly updated down-sum is being written back to the down accumulator, that down-sum is simultaneously passed to the cross delay. A cross delay is a memory (e.g., FIFO or RAM) that holds each down-sum entering it (stored to it) for M columns, before outputting (or accessing) the same down-sum. In other words, as each down-sum is stored to the cross delay, it is held, then referenced M columns later. We can call each down-sum entering the cross delay a "new" down-sum, and each pixel exiting the cross delay an "old" down-sum.

A cross accumulator is a single memory element with sufficient data bits to hold the maximum sum of (M * N) image pixel values (the maximum sum of the pixel values in the sub-image). The value in the cross accumulator is called a cross-sum, and represents the sum of pixel values in an M column by N row sub-image.

During operation, the cross accumulator logic takes the existing cross-sum from the cross accumulator, subtracts off the old (delayed) down-sum, adds in the new incoming down-sum, and stores the new cross-sum back in the cross accumulator. For each new incoming per-column down-sum in the image, a new cross-sum is calculated, using this running average method.

To initialize the cross accumulator upon startup, the process takes place as describe above, with the accumulator logic forcing the existing cross-sum to zero for the first new down-sum in each row, and forcing the old down-sum to zero for the first M new down-sums in each row. This allows the cross accumulator to initialize by summing together the first M columns of down-sums in each row before performing a running average. Note that the cross-sum in the cross accumulator is not valid for the first (M-1) new down-sums in a row.

As each newly updated cross-sum is written back to the cross accumulator, it is simultaneously passed to a divider. The cross-sum is the sum of all pixels in an M column by N row sub-image. The divider divides the cross-sum value by the produced (M * N). The result is the average pixel value in each M×N sub-image. This average can then be routed for thresholding or additional processing as described above.

There are variants that minimize and simplify this implementation. Arbitrary division can results in complex implementation or slow performance. If the total number of pixels in the averaging sub-image is restricted to being a power of two, a simple high-order bit sub-selection (shifting) can be used to effect the division, resulting in a slight loss of accuracy by truncation. Another alternative is to limit each dimension (rows and columns) of the sub-image to a power of two. In this case, the down-sums can be shifted (divided by the sub-image height N) prior to being passed to the cross delay and cross accumulator logic. Each cross-sum can be shifted (divided by the sub-image width M) prior to being passed on for further processing. Additional inaccuracy is introduced by taking an "average of averages", but in some applications this may be acceptable. Lastly, in some cases, it may be not be necessary to divide the cross-sums at all. Some thresholding and other processing can work on an accumulated sum rather than an average. This can often be accomplished by scaling threshold to the magnitude of the sub-image size. For example, threshold values operating on 7×5 sub-images may be scaled up by a factor of 35 to operate on the sub-image sum rather than the sub-image average.

Discussed above are systems and methods meeting the desired objects.

We claim:

1. In a machine vision method of thresholding a first image, the improvement comprising the step of
for each of at least selected neighborhoods of plural pixels in the first image:
generating a defocused value that is a statistical function of values of the plural pixels in that neighborhood,
comparing that defocused value with one or more first thresholds and generating, based on that comparison, a first neighborhood threshold result for that neighborhood, wherein the one or more first thresholds are held constant for all neighborhoods,
comparing that defocused value with one or more second thresholds and generating, based on that comparison, a second neighborhood threshold result for that neighborhood, and wherein the one or more second thresholds vary in accord with a region of the image in which that neighborhood is located, and
generating a threshold image comprising any of the first and second neighborhood threshold results.

2. In a machine vision method according to claim 1, the further improvement wherein the generating step includes generating each defocused value as an average of the values of the plural pixels in the respective neighborhood.

3. In a machine vision method according to claim 1, the further improvement comprising positioning any of the first and second neighborhood threshold results in the threshold image based on a position of the corresponding neighborhoods in the first image.

4. In a machine vision method according to claim 1, the further improvement wherein the step of generating the defocused value includes maintaining running averages of columns of pixels from the first image.

5. In a machine vision method according to claim 1, the further improvement wherein sizes and shapes of the neighborhoods vary along the image.

6. In a machine vision method according to claim 1, the further improvement wherein the defocused values are generated using a filter that includes
 a down delay memory that holds each new image pixel values entering the filter for a specified period before outputting it,
 a down accumulator having J storage elements, where J is a number of columns in the first image, each element maintaining a sum of N rows of pixel values for a corresponding column of the first image,
 down accumulator logic, coupled with the down delay memory and with the down accumulator, the down accumulator logic adding each new image pixel value to a sum maintained by the down accumulator for the column with which the new pixel value is associated, subtracting therefrom a pixel value output by the down delay memory, and storing a new down-sum result back into the down accumulator,
 a cross delay memory, coupled with the down accumulator logic, that holds each new down-sum result for a specified period before outputting it,
 a cross accumulator that maintains a sum of a current M-column by N-row rectangular neighborhood,
 cross accumulator logic, coupled with the cross delay memory and with the cross accumulator, that adds each newly calculated down-sum to a sum maintained in the cross accumulator, subtracts therefrom a down-sum output by the cross delay memory, and stores a new cross-sum result back to the cross accumulator.

7. In a machine vision method of thresholding a first image, the improvement comprising the step of
 for each of at least selected groups of plural image pixels in the first image;
  generating a defocused value that is a statistical function of values of the plural pixels in that group,
  comparing that defocused value with one or more thresholds and generating, based on that comparison, a group threshold result for that group, and
  generating a threshold image comprising the group threshold results for a plurality of groups of the first image.

8. In a machine vision method according to claim 7, the improvement wherein the one or more thresholds are held constant for all groups of image pixels.

9. In a machine vision method according to claim 7, the improvement wherein the one or more thresholds used with at least one group of image pixels varies from the one or more thresholds used with at least one other group of image pixels.

10. In a machine vision method according to 9, the further improvement wherein the one or more thresholds are a function of values of plural pixels in a region that includes a plurality of groups of image pixels.

11. In a machine vision method according to claim 7, the further improvement comprising positioning the group threshold results in the threshold image based on a position of the corresponding groups in the first image.

12. In a machine vision method according to claim 7, the further improvement wherein the step of generating the defocused value includes maintaining running averages of columns of pixels from the first image.

13. In a machine vision method according to claim 7, the further improvement wherein each of the selected groups comprise neighboring pixels.

14. In a machine vision method according to claim 7, the further improvement wherein the generating step includes generating the defocused value as an average of the values of the plural pixels in the respective group.

15. In a machine vision system of the type that thresholds a first image, the improvement comprising a filter used to calculate an average pixel value of an M-column by N-row neighborhood within the first image, the filter including
 a down delay memory that holds each new image pixel value entering the filter for a specified period before outputting it,
 a down accumulator having J storage elements, where J is a number of columns in the first image, each element maintaining a sum of N rows of pixel values for a corresponding column of the first image,
 down accumulator logic, coupled with the down delay memory and with the down accumulator, the down accumulator logic adding each new pixel value to a sum maintained by the down accumulator for the column with which the new pixel value is associated, subtracting therefrom a pixel value output by the down delay memory, and storing a new down-sum result back into the down accumulator,
 a cross delay memory, coupled with the down accumulator logic, that holds each new down-sum for a specified period before outputting it,
 a cross accumulator that maintains a sum of a current M-column by N-row rectangular neighborhood,
 cross accumulator logic, coupled with the cross delay memory and with the cross accumulator, that adds each newly calculated down-sum to a sum maintained in the cross accumulator, subtracts therefrom a down-sum output by the cross delay memory, and stores a new cross-sum result back to the cross accumulator.

16. In a machine vision system according to claim 15, the further improvement comprising a divider, coupled with the cross accumulator logic, that divides each new cross-sum by a product of M * N.

17. In a machine vision system according to claim 15, the improvement comprising level thresholding that compares the new cross-sum with one or more first thresholds and generates, based on that comparison, a first neighborhood threshold result for that neighborhood, where the one or more first threshold are constant for all neighborhoods.

18. In a machine vision system according to claim 17, the improvement comprising base line threshold logic that compares the new cross-sum with one or more second thresholds and generates, based on that comparison, a second neighborhood threshold result for that neighborhood, where the one or more second threshold vary in accord with a region of the image in which the respective neighborhood is located.

19. In a machine vision system according to claim 18, the further improvement comprising logic that generates an threshold image comprising any of the first and second neighborhood threshold results.

20. In a machine vision inspection method that includes acquiring a first image and thresholding at least selected pixels in the image on a per pixel basis, the improvement comprising the steps of:
 digitally defocusing the image by generating, for each of at least selected neighborhoods of plural image pixels in the first image, a defocused, value that is an average of values of the plural pixels in that neighborhood,
 comparing that defocused value with one or more thresholds, and generating, based on that comparison, a neighborhood threshold result for that neighborhood, generating for each of at least selected pixels in the first image an additional result that is a function of (i) a neighborhood threshold result for a neighborhood which includes that pixel, (ii) a result determined by thresholding that pixel on a per pixel basis.

21. In a machine vision method according to claim 20, the improvement wherein the one or more threshold are held constant for all neighborhoods of image pixels.

22. In a machine vision method according to claim 20, the improvement wherein the one or more thresholds used with at least one neighborhood of image pixels vary from value of the threshold used with at least one other neighborhood of image pixels.

23. In a machine vision method according to 22, the further improvement wherein the one or more thresholds are a function of values of plural pixels in a region that includes a plurality of neighborhoods of image pixels.

24. In a machine vision method according to claim 20, the further improvement comprising generating a threshold image comprising the neighborhood threshold results for a plurality of neighborhoods of the first image.

25. In a machine vision method according to claim 24, the further improvement comprising concurrently displaying the first image and threshold images in order to facilitate operator evaluation of an object imaged thereby.

* * * * *